(12) United States Patent
Miura et al.

(10) Patent No.: US 6,479,121 B1
(45) Date of Patent: Nov. 12, 2002

(54) OPTICAL RECORDING MEDIUM AND METHOD OF FABRICATING SAME

(75) Inventors: Hiroshi Miura; Katsunari Hanaoka, both of Atsugi; Nobuaki Onagi, Yokohama; Makoto Harigaya, Hiratsuka, all of (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 09/665,473

(22) Filed: Sep. 20, 2000

(30) Foreign Application Priority Data

Sep. 21, 1999 (JP) .............................................. 11-266970
Apr. 19, 2000 (JP) ....................................... 2000-117774

(51) Int. Cl.$^7$ ................................................ B32B 3/02
(52) U.S. Cl. .................... 428/64.1; 428/64.5; 428/64.6; 430/270.13
(58) Field of Search ................................ 428/64.1, 64.4, 428/64.5, 64.6, 913; 430/270.13, 495.1, 945; 369/283, 288

(56) References Cited

U.S. PATENT DOCUMENTS 6,108,295 A * 8/2000 Ohno ...................... 369/275.2
6,115,352 A * 9/2000 Ohno ...................... 369/275.4

FOREIGN PATENT DOCUMENTS

| JP | 5342629 | 12/1993 |
| JP | 9161316 | 6/1997 |
| JP | 10226713 | 8/1998 |
| JP | 11096596 | 4/1999 |

* cited by examiner

Primary Examiner—Elizabeth Mulvaney
(74) Attorney, Agent, or Firm—Cooper & Dunham LLP

(57) ABSTRACT

An optical information recording medium having a substrate, a first dielectric layer provided on the substrate, a recording layer provided on the first dielectric layer, a second dielectric layer provided on the recording layer, a light reflection and heat dissipation layer provided on the light reflection and heat dissipation layer, and a crystallization accelerating layer provided in contact with at least a portion of the recording layer and made of a material including a substance selected from Bi, Bi-containing compounds, Al, Al-containing compounds, In, In-containing compounds, Tl and Tl-containing compounds.

14 Claims, 1 Drawing Sheet

FIGURE
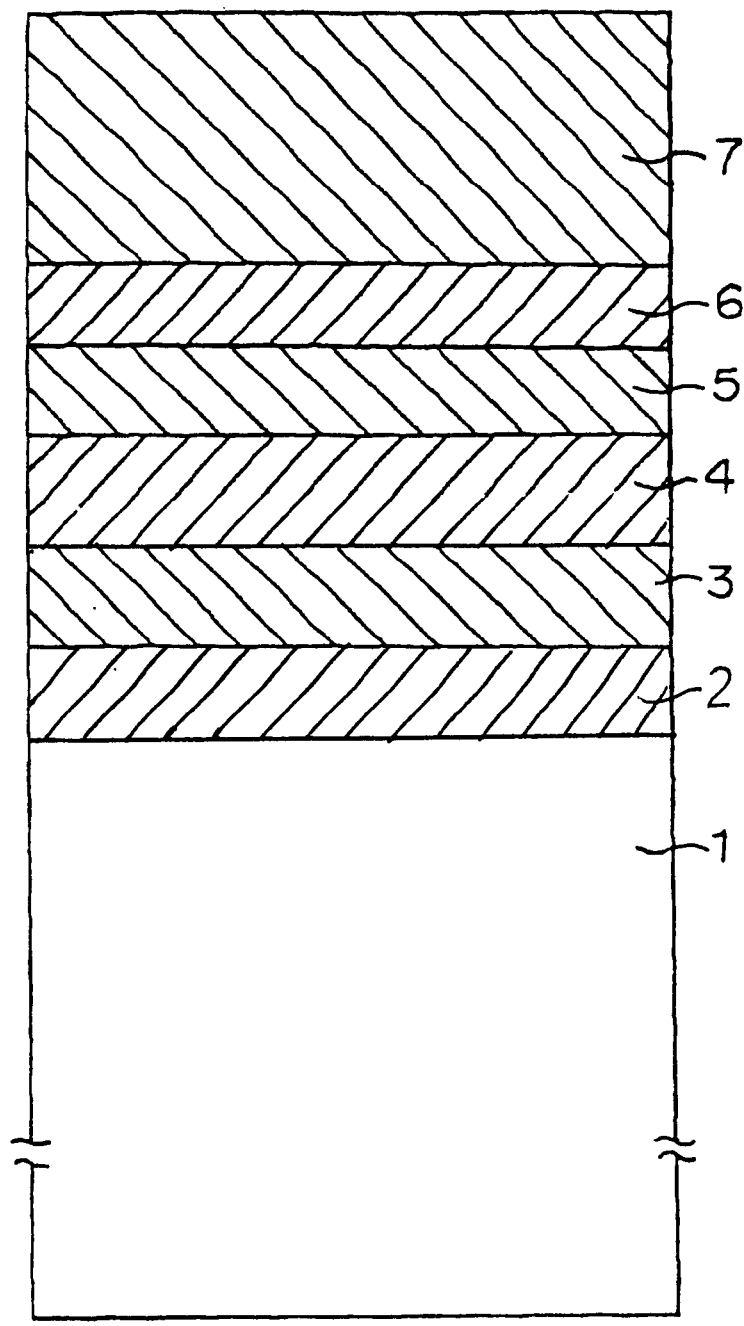

OPTICAL RECORDING MEDIUM AND METHOD OF FABRICATING SAME

BACKGROUND OF THE INVENTION

This invention relates to an optical recording medium and a method of fabricating same. More particularly, the present invention is directed to a rewritable optical recording medium of a phase-change type which does not require initialization or which requires only a short time for initialization.

There is conventionally known a phase-change optical recording medium which utilizes phase changes between a crystalline phase and an amorphous phase and is capable of recording, reproducing and erasing information by the application thereto of a laser beam. Such a recording medium permits overwriting with a single beam and has compatiblity with CD-ROM and CD-R, and is expected to be utilized as DVD-RAM medium.

In phase-change type optical recording media, the recording layer generally assumes amorphous state in a recorded condition and crystalline state in an erased condition. Thus, the recording media are required to be initialized after the recording layer has been formed. The initialization is carried out by a thermal treatment such as by irradiation with a laser beam. The initialization requires a process time of more than 30 seconds and causes a reduction of throughput. Further, costs of apparatuses for producing the optical recording media increase.

JP-A-H09-161316 discloses an optical recording medium having a crystallization accelerating layer formed between a substrate and a recording layer and made of $Sb_xTe_{(1-x)}$ where x is a number greater than 0.3 and smaller than 0.5. The accelerating layer is described as serving to shorten a time required for initialization.

JP-A-H11-96596 discloses an optical recording medium having a crystallization accelerating layer formed between a substrate and a recording layer and made of a Ge-Te-Sb or Ge-Te-Sb-Bi alloy having a relatively low crystallization temperature. The accelerating layer is selected from Bi, Sb, Bi compounds and Sb compounds. The accelerating layer is described to permit omission of initialization.

According to the known techniques, initialization becomes unnecessary only when the recording layer has a low crystallization temperature and is easily crystallized. The use of a recording layer having a low crystallization temperature, however, has a problem because storage stability of the amorphous recorded marks.

SUMMARY OF THE INVENTION

In accordance with one aspect of the present invention, there is provided an optical information recording medium, comprising a substrate, a first dielectric layer provided on said substrate, a recording layer provided on said first dielectric layer, a second dielectric layer provided on said recording layer, a light reflection and heat dissipation layer provided on said light reflection and heat dissipation layer, and a crystallization accelerating layer provided in contact with at least a portion of said recording layer and made of a material comprising a substance selected from the group consisting of Bi, Bi-containing compounds, Al, Al-containing compounds, In, In-containing compounds, Tl and Tl-containing compounds.

In another aspect, the present invention provides a method of fabricating an optical information recording medium, comprising the steps of forming a first dielectric layer on a substrate, forming a recording layer on said first dielectric layer, forming a second dielectric layer on said recording layer, forming a light reflection and heat dissipation layer on said light reflection and heat dissipation layer, and forming a crystallization accelerating layer in contact with at least a portion of said recording layer, said crystallization accelerating layer being made of a material comprising a substance selected from the group consisting of Bi, Bi-containing compounds, Al, Al-containing compounds, In, In-containing compounds, Tl and Tl-containing compounds.

It is an object of the present invention to provide an optical recording medium which does not require initialization or which requires only a short time for initialization.

Another object of the present invention is to provide an optical recording medium which has good storage stability of amorphous marks.

BRIEF DESCRIPTION OF THE DRAWING

Other objects, features and advantages of the present invention will become apparent from the detailed description of the preferred embodiments of the invention which follows, when considered in the light of the accompanying drawings, in which:

the sole FIGURE is a schematic illustration of an embodiment of an optical recording medium according to the present invention.

DETAILED DESCRIPTION OF THE PREFERRED

Embodiments of the Invention

Referring to FIGURE, an optical recording medium according to one embodiment of the present invention includes a substrate 1 on which a first dielectric layer 2, a crystallization accelerating layer 3, a recording layer 4, a second dielectric layer 5, a light reflection and heat dissipation layer 6 and a protecting layer 7 are provided in succession in this order. The layers 2 through 6 may be formed by sputtering or vapor deposition.

As the substrate 1, a transparent resin such as polycarbonate, acrylic resin or polyolefin, or glass, may be employed. Above all, a polycarbonate resin is preferably used.

As the first and second dielectric layers 2 and 5, any conventionally used materials may be employed. For example, a metal oxide such as $SiO_x$, ZnO, $SnO_2$, $Al_2O_3$, $TiO_2$, $In_2O_3$, MgO, $ZrO_2$ or $Ta_2O_5$; a nitride such as $Si_3N_4$, AlN, TiN, BN or ZrN; a sulfide such as ZnS or $TaO_4$, or a carbide such as SiC, TaC, $B_4C$, WC, TiC or ZrC may be used. These materials may be used singly or in combination of two or more. A mixture of ZnS and $SiO_x$ and a mixture of $Ta_2O_5$ and $SiO_x$ are suitable examples of such combination.

The first dielectric layer 2 generally has a thickness of 50–250 nm, preferably 75–200 nm, for reasons of protecting characteristics, heat resistance, heat storage, easiness of preparation, recording sensitivity and mechanical strengths. The second dielectric layer 5 generally has a thickness of 10–100 nm, preferably 15–50 nm, for reasons of heat resistance, recording sensitivity, mechanical strengths and overwriting characteristics.

As the light reflection and heat dissipation layer 6, an elementary metal of Al, Au, Cu, Ag, Cr, Sn, Zn, In, Pd, Zr, Fe, Co, Ni, Si, Ge, Sb, Ta, W or Ti, an alloy containing two or more of these metals or a mixture thereof may be used. If desired, the layer 6 may be formed of a laminate of different materials of the above metals or alloys. The light reflection and heat dissipation layer 6 generally has a thickness of 30–250 nm, preferably 50–150 nm, for reasons of efficiency of heat dissipation, sensitivity and overwriting characteristics.

The protecting layer 7, which is optionally provided on the light reflection and heat dissipation layer 6, is formed of a ultraviolet light-hardenable resin or a thermosetting resin.

In the embodiment shown in FIGURE, the crystallization accelerating layer 3 is provided between the first dielectric layer 2 and the recording layer 4. If desired, however, the crystallization accelerating layer 3 may be provided between the second dielectric layer 5 and the recording layer 4. In either case, it is important that the crystallization accelerating layer 3 should be in contact with at least a portion of the recording layer 4. The crystallization accelerating layer 3 may be a continuous layer or a discontinuous (such as islands) or sparse layer and has a thickness of generally 1/100 to 1/2, preferably 1/40 to 1/10 of the thickness of the recording layer. The thickness of the accelerating layer is generally 0.5–20 nm, preferably 0.5–5 nm, more preferably 0.5–2 nm.

The accelerating layer 3 is made of a material including a substance selected from the group consisting of Bi, Bi-containing compounds, Al, Al-containing compounds, In, In-containing compounds, Tl and Tl-containing compounds.

The Bi-containing compounds may be compounds composed of Bi and one or more other elements such as Ag, Br, Ca, Cd, Ce, Cl, Co, Cr, Cu, Fe, Ga, Ge, H, Hg, In, Ir, K, La, Li, Mg, Mn, Mo, N, Na, Ni, O, P, Pb, Pd, Po, Pr, Pt, Pu, Rb, Rh, Ru, S, Sb, Se, Si, Sn, Sr, Te, Th, Ti, Tl and U. The proportion of Bi in the Bi-containing compound is generally 5–100 atomic %, preferably 25–100 atomic %, more preferably 40–100 atomic %.

The Al-containing compounds may be compounds composed of Al and one or more other elements such as Ag, Br, Ca, Cd, Ce, Cl, Co, Cr, Cu, Fe, Ga, Ge, H, Hg, In, Ir, K, La, Li, Mg, Mn, Mo, N, Na, Ni, O, P, Pb, Pd, Po, Pr, Pt, Pu, Rb, Rh, Ru, S, Sb, Se, Si, Sn, Sr, Te, Th, Ti, Tl and U. The In-containing compounds may be compounds composed of In and one or more other elements such as Ag, Bi, Br, Ca, Cd, Ce, Cl, Co, Cr, Cu, Fe, Ga, Ge, H, Hg, Ir, K, La, Li, Mg, Mn, Mo, N, Na, Ni, O, P, Pb, Pd, Po, Pr, Pt, Pu, Rb, Rh, Ru, S, Sb, Se, Si, Sn, Sr, Te, Th, Ti, Tl and U.

The Tl-containing compounds may be compounds may be compounds composed of Tl and one or more other elements such as Ag, Bi, Br, Ca, Cd, Ce, Cl, Co, Cr, Cu, Fe, Ga, Ge, H, Hg, In, Ir, K, La, Li, Mg, Mn, Mo, N, Na, Ni, O, P, Pb, Pd, Po, Pr, Pt, Pu, Rb, Rh, Ru, S, Sb, Se, Si, Sn, Sr, Te, Th, Ti and U.

The accelerating layer containing Bi, Bi-containing compounds, Al, Al-containing compounds, In, In-containing compounds, Tl and Tl-containing compounds, when formed, is crystallized and can function as crystal nuclei for a recording layer. Thus, the recording layer as formed is crystallized and does not require initialization. Moreover, because of low melting point, the accelerating layer is melted during irradiation with an energy beam such as laser and is mixed with the recording layer. Since the Group III elements such as Al, In and Tl have an effect for increasing the crystallization temperature of the recording layer, the record has an improved storage stability. Once recording has been done, the accelerating layer disappears and no longer accelerates the crystallization of recorded marks. For this reason, too, the record has an improved storage stability. It is preferred that the recorded amorphous mark have a crystallization temperature of at least 160° C. The crystallization temperature can be controlled by control of the thickness of the crystallization accelerating layer and of the recording layer as well as the composition of the recording layer.

The recording layer 4 is of a phase-change type whose crystal phase reversibly changes between a crystalline phase and an amorphous phase upon irradiated with a laser beam.

In one embodiment, the recording layer 4 may be made of a material containing Ag, In, Sb and Te. Such a material may be represented by the following formula:

$$Ag_\alpha In_\beta Sb_\gamma Te_\delta$$

wherein $\alpha$, $\beta$, $\gamma$ and $\delta$ represent atomic percentages and satisfying the following conditions:

$0 < \alpha \leq 10$ (preferably $0.1 \leq \alpha \leq 10$)

$1 < \beta \leq 20$ $35 \leq \gamma \leq 80$ $20 \leq \delta \leq 35$ $\alpha + \beta + \gamma + \delta + = 100$.

The recording layer made of a material containing Ag, In, Sb and Te is preferably used when the crystallization accelerating layer 3 is made of Bi or a Bi-containing compound. The recording layer made of a material containing Ag, In, Sb and Te may additionally contain at least one element selected from the group consisting of B, N, C, P, Si, O, S, Se, Al, Ti, V, Mn, Fe, Co, Ni, Cr, Cu, Zn, Ga, Sn, Pd, Pt, Au and Ge.

Alternatively, the recording layer may be made of a phase-change type material containing a metastable $Sb_3Te$ phase belonging to the space group Fm3m.

The metastable $Sb_3Te$ phase-containing recording layer may additionally contain at least one additional element selected from the group consisting of those belonging to Ib, II, III, IV, V and VI of the Period Table, including rare earth elements and transition metals.

It is preferred that the recording layer containing metastable $Sb_3Te$ phase as well as at least one additional element have a crystallization temperature of not higher than 200° C., more preferably 120–200° C., most preferably 145–190° C., since the resulting optical disc does not require initialization. Especially preferred is the use of Ge as the additional element. Thus, examples of Ge-and metastable $Sb_3Te$ phase-containing recording layers include Ge—Sb—Te, Ge—Ag—In—Sb—Te, Ge—In—Sb—Te and Ge—Ag—Sb—Te layers. Parenthetically, the above Ge—Sb—Te layer differs from the conventional $Ge_2Sb_2Te_5$ layer in that the latter does not contain a metastable $Sb_3Te$ phase but contains $GeTe—Sb_2Te_3$. The amount of Ge is preferably at least 0.5 atomic %, more preferably at least 2 atomic %, most preferably at least 4 atomic %, with the upper limit of less than 10 atomic %.

As the recording layer 4, there may be preferably used Ag—In—Sb—Te, Ge—Sb—Te, Ge—Ag—In—Sb—Te or Ge—In—Sb—Te material, when the accelerating layer 3 is made of a material containing Bi, Bi-containing compounds, Al, Al-containing compounds, In, In-containing compounds, Tl and Tl-containing compounds. One or more additional elements such as those exemplified above may be incorporated in the above recording layer, if desired.

The recording layer 4 generally has a thickness of 10–100 nm, preferably 15–35 nm, more preferably 17–25 nm.

With the recording medium according to the present invention, information can be recorded and reproduced using, for example, a pickup of NA 0.6 with a semiconductor laser beam at a wavelength of 635 nm or a wavelength of 650 nm. Pulse width modulation of modulation code of EFM or EFM+[8/16RLL(2,10)] may be adopted. Conditions of powers may be: heating (recording) power>erasing power>cooling power. The cooling power is reduced to a degree comparable to the read out power. The linear velocity is in the range of 3.5 m/sec to 6.5 m/sec, and the read out power is 1 mW or less.

The following examples will further illustrate the present invention.

EXAMPLES 1–25

A polycarbonate substrate having a diameter of 120 cm and a thickness of 0.5 mm was prepared by injection molding. On this substrate, a ZnS·SiO$_2$ film (first dielectric layer) was formed by sputtering in PC1 chamber under the following conditions:
Target: SiO$_2$(20.5 mol %), ZnS(79.5 mol %)
Power applied: RF 4 kW/8 inch target
Gas pressure: 2 mTorr
Gas: Ar
Film thickness: 190 nm Next, a crystallization accelerating layer having the composition shown in Table 1 was formed on the first dielectric layer by sputtering in PC2 chamber under the following conditions:
Target: shown in Table 1
Power applied: DC 0.4 kW/8 inch target
Gas pressure: 2 mTorr
Gas: Ar
Film thickness: 0.75 nm, 2.5 nm, 5.0 nm Next, a recording layer having the composition shown in Table 1 was formed on the crystallization accelerating layer by sputtering in PC3 chamber under the following conditions:
Target: shown in Table 1
Power applied: DC 0.4 kw/8 inch target
Gas pressure: 2 mTorr
Gas: Ar
Film thickness: 15 nm Next, a ZnS·SiO$_2$ film (second dielectric layer) was formed by sputtering in PC4 chamber under the following conditions:
Target: SiO$_2$(20.5 mol %), ZnS(79.5 mol %)
Power applied: RF 4 kW/8 inch target
Gas pressure: 2 mTorr
Gas: Ar
Film thickness: 20 nm Next, an Al film (light reflection and heat dissipation layer) was formed on the second dielectric layer by sputtering in PC5 chamber under the following conditions:
Target: Al
Power applied: DC 5 kW/8 inch target
Gas pressure: 2 mTorr
Gas: Ar
Film thickness: 140 nm A UV-curable resin was then applied to the light reflection and heat dissipation layer and the coating was irradiated with UV light to form a protecting layer having a thickness of 3 μm.

The thus prepared phase change type optical discs were measured for reflectance. The results are shown in Table 1. It was found that the all of these optical discs including those having a thickness of the crystallization accelerating layer of 0.75 nm had a reflectance of higher than 18%. This suggests that the recording layer of each of the optical discs is a crystalline film. The X-ray diffraction analysis of the recording layers revealed that they contained a metastable Sb$_3$Te phase belonging to the space group Fm3m. The crystalline accelerating layers having thickness of 2.5 nm and 5.0 nm were found to be continuous films. However, the accelerating layers having thickness of 0.75 nm were not continuous films.

Each of the optical discs of Examples 1–25 was found to allow recording and reproduction of information without initialization and to show satisfactory rewritability and storage stability.

TABLE 1

| Example | Composition of Recording Layer (atomic percentage) | | | | | | | | | | Accelerating Layer | Reflectance (%) |
|---|---|---|---|---|---|---|---|---|---|---|---|---|
| | Ag | Au | In | Al | Sb | Bi | Te | Ge | Zn | V | | |
| 1 | 3 | | 12 | | 55 | | 30 | | | | Bi | >18 |
| 2 | 1 | | 8 | | 65 | | 26 | | | | Bi | >18 |
| 3 | 8 | | 5 | | 55 | | 32 | | | | Bi | >18 |
| 4 | 3 | | 5 | | 65 | | 27 | | | | Bi | >18 |
| 5 | 1 | | 8 | | 65 | | 26 | | | | Bi | >18 |
| 6 | 5 | | 3 | | 60 | | 29 | 3 | | | Bi | >18 |
| 7 | 3 | | 3 | | 62 | | 29 | 3 | | | Bi | >18 |
| 8 | 0.5 | | 5 | | 67.5 | | 25 | 2 | | | Bi | >18 |
| 9 | | | | | 73 | | 20 | 7 | | | Bi | >18 |
| 10 | | | | | 68 | | 23 | 9 | | | Bi | >18 |
| 11 | | | 4 | | 70 | | 26 | | | | Bi | >18 |
| 12 | 3 | | | | 66 | | 31 | | | | Bi | >18 |
| 13 | | | 2 | | 68 | | 28 | 2 | | | Bi | >18 |
| 14 | 1 | | | | 70 | | 26 | 3 | | | Bi | >18 |
| 15 | 3 | | | 4 | 65 | | 28 | | | | Bi | >18 |
| 16 | 4 | | 3 | 2 | 58 | | 33 | | | | Bi | >18 |
| 17 | 2 | 2 | 3 | | 65 | | 26 | 2 | | | Bi | >18 |
| 18 | 3 | | 5 | | 63 | 2 | 27 | | | | Bi | >18 |
| 19 | 3 | | 2 | | 68 | | 25 | | | 2 | Bi | >18 |
| 20 | | | 7 | | 65 | | 26 | | 2 | | Bi | >18 |
| 21 | | | | | 69 | | 28 | 3 | | | Bi$_2$Te$_3$ | >18 |
| 22 | 0.5 | | 5 | | 67.5 | | 25 | 2 | | | Bi$_2$Te$_3$ | >18 |

TABLE 1-continued

| | Composition of Recording Layer (atomic percentage) | | | | | | | | | | Accelerating | Reflectance |
|---|---|---|---|---|---|---|---|---|---|---|---|---|
| Example | Ag | Au | In | Al | Sb | Bi | Te | Ge | Zn | V | Layer | (%) |
| 23 | 8 | | 5 | | 55 | | 32 | | | | BiSb | >18 |
| 24 | 0.5 | | 5 | | 61.5 | | 31 | | 2 | | BiSb | >18 |
| 25 | | | | | 70 | | 28 | | 2 | | BiIn | >18 |

Comparative Examples 1–25

Examples 1–25 were each repeated in the same manner as described except that the accelerating layer was not formed. It was found that the all of these optical discs had a reflectance of smaller than 5%. Without initialization, recording and reproduction of information were not able to be performed.

EXAMPLES 26–30

Phase change type optical discs were prepared in the same manner as described in Example 1 except that the composition of the recording layer was changed as shown in Table 3. The thus prepared optical discs were measured for reflectance and storage stability. Storage stability test was evaluated as follows:

Information is written at a recording speed of 7.0 m/s and a recording power of 13 mW. After recording, the disc is stored at 80° C. under relative humidity of 85% for 100 hours. Thereafter, the disc is reproduced at a reproducing speed of 3.5 m/s and reproducing power of 0.8 mW. The stability is evaluated in terms of jitter of 3T signals.

Each of the optical discs of Examples 26–30 was found to allow recording and reproduction of information without initialization and to show satisfactory rewritability and storage stability. The optical discs of Examples 29 and 30 required initialization. However, the initialization was able to be performed with only one third (⅓) of a laser power or with only about one half (½) an initialization time required for initializing an optical disc having no Bi accelerating layer. It is thus revealed that it is particularly preferred that the recording layer have a crystallization temperature of 145–190° C. The crystallization temperature can be determined by thermal analysis, such as DSC analysis at a heating rate of 10° C./minute.

EXAMPLE 31

Example 1 was repeated in the same manner as described except that the crystallization accelerating layer and the recording layer were formed under the following conditions.

A crystallization accelerating layer of Bi was formed on the first dielectric layer by sputtering in PC2 chamber under the following conditions:
Target: Bi
Power applied: DC 0.4 kW/8 inch target
Gas pressure: 2 mTorr
Gas: Ar
Film thickness: 1.3 nm, 2.5 nm, 5.0 nm A recording layer having the composition shown in Table 4 was formed on the crystallization accelerating layer by sputtering in PC3 chamber under the following conditions:
Target: Ag—In—Sb—Te
Power applied: DC 0.4 kW/8 inch target
Gas pressure: 2 mTorr
Gas: Ar
Film thickness: 15 nm

Comparative Examples 26–28

Examples 31–33 were each repeated in the same manner as described except that the crystallization accelerating layer of Bi was not formed.

The thus prepared phase change type optical discs were measured for reflectance. The results are shown in Table 4.

EXAMPLES 34–39

A polycarbonate substrate having a diameter of 120 cm and a thickness of 0.6 mm was prepared by injection molding. On this substrate, a ZnS·SiO$_2$ film (first dielectric layer) was formed by sputtering in PC1 chamber under the following conditions:
Target: SiO$_2$(20.5 mol %), ZnS(79.5 mol %)
Power applied: RF 4 kW/8 inch target
Gas pressure: 2 mTorr
Gas: Ar
Film thickness: 190 nm Next, a crystallization accelerating layer having the composition shown in Table 1 was formed on the first dielectric layer by sputtering in PC2 chamber under the following conditions:
Target: shown in Table 5
Power applied: DC 0.4 kW/8 inch target
Gas pressure: 2 mTorr
Gas: Ar
Film thickness: Table 5

Next, a recording layer having the composition shown in Table 5 was formed on the crystallization accelerating layer by sputtering in PC3 chamber under the following conditions:
Target: shown in Table 5
Power applied: DC 0.4 kW/8 inch target
Gas pressure: 2 mTorr
Gas: Ar
Film thickness: shown in Table 5

Next, ZnS·SiO$_2$ film (second dielectric layer) was formed by sputtering in PC4 chamber under the following conditions:
Target: SiO$_2$(20.5 mol %), ZnS(79.5 mol %)
Power applied: RF 4 kW/8 inch target
Gas pressure: 2 mTorr
Gas: Ar
Film thickness: 20 nm Next, an Al film (light reflection and heat dissipation layer) was formed on the second dielectric layer by sputtering in PC5 chamber under the following conditions:
Target: Al
Power applied: DC 5 kW/8 inch target
Gas pressure: 2 mTorr
Gas: Ar
Film thickness: 140 nm A UV-curable resin was then applied to the light reflection and heat dissipation layer and the coating was irradiated with UV light to form a protecting layer having a thickness of 3 μm.

The thus prepared phase change type optical discs were measured for reflectance. It was found that the all of these optical discs had a reflectance of higher than 18% and that recording of information was able to be carried out without initialization. Each of the optical discs was also measured for storage stability. Thus, after recording, the disc was stored at 80° C. under relative humidity of 85% for 1000 hours. At storage time of 50, 100, 200, 300, 500, 750 and 1000 hours, the sample disc was reproduced. The stability is evaluated in terms of jitter of mark edges. It was found that the optical discs of Examples 34–39 showed constant jitter of 7% throughout the respective storage time.

After the recording, the recording layer of each of the optical discs was measured for the crystallization temperature. It was found that the crystallization temperature was 160° C. or more. It is believed that the crystallization accelerating layer interacted with the recording layer during recording to increase the crystallization temperature of the recording layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An optical information recording medium, comprising a substrate, a first dielectric layer provided on said substrate, a recording layer provided on said first dielectric layer, a second dielectric layer provided on said recording layer, a light reflection and heat dissipation layer provided on said second dielectric layer, and a crystallization accelerating layer provided in contact with at least a portion of said recording layer and made of a material comprising a substance selected from the group consisting of Bi, Bi-containing compounds, Al, Al-containing compounds, In, In-containing compounds, Tl and Tl-containing compounds, wherein the crystallization accelerating layer is a discontinuous layer.

2. An optical information recording medium as claimed in claim 1, wherein said recording layer is made of a material containing Ag, In, Sb and Te.

3. An optical information recording medium as claimed in claim 2, wherein said recording layer is made of a material represented by the following formula:

wherein α, β, γ and δ represent atomic percentages and satisfying the following conditions:

$0 < \alpha \leq 10$ $1 < \beta \leq 20$ $35 \leq \gamma \leq 80$ $20 \leq \delta \leq 35$ $\alpha + \beta + \gamma + \delta = 100.$ 4. An optical information recording medium as claimed in claim 2, wherein said recording layer additionally contains at least one element selected from the group consisting of B, N, C, P, Si, O, S, Se, Al, Ti, V, Mn, Fe, Co, Ni, Cr, Cu, Zn, Ga, Sn, Pd, Pt, Au and Ge.

5. An optical information recording medium as claimed in claim 1, wherein said recording layer is made of a phase-change type material containing a metastable $Sb_3Te$ phase belonging to the space group Fm3m.

6. An optical information recording medium as claimed in claim 5, wherein said recording layer additionally contains at least one element selected from the group consisting of those belonging to Ib, II, III, IV, V and VI of the Period Table.

7. An optical information recording medium as claimed in claim 5, wherein said recording layer additionally contains Ge.

8. An optical information recording medium as claimed in claim 1, wherein said crystallization accelerating layer is made of a material comprising a substance selected from the group consisting of Al, Al-containing compounds, In, In-containing compounds, Tl and Tl-containing compounds and wherein, when said recording layer is irradiated with an energy beam to form an amorphous recording mark, those portions of said recording layer and said crystallization accelerating layer irradiated with the energy beam form an amorphous mark having a crystallization temperature of at least 160° C.

9. An optical information recording medium as claimed in claim 1, wherein said crystallization accelerating layer is made of a material comprising a substance selected from the group consisting of Al, Al-containing compounds, In, In-containing compounds, Tl and Tl-containing compounds and wherein, when said recording layer is irradiated with an energy beam to form an amorphous recording mark, those portions of said crystallization accelerating layer irradiated with the energy beam are diffused into said recording layer and disappear.

10. An optical information recording medium as claimed in claim 1, wherein said crystallization accelerating layer has a thickness of 0.5–5.0 nm.

11. An optical information recording medium as claimed in claim 1, wherein said crystallization accelerating layer is interposed between said first dielectric layer and said recording layer.

12. An optical information recording medium, as recited in claim 1, wherein the recording layer contains a crystallization accelerating element.

13. A method of fabricating an optical information recording medium, comprising the steps of forming a first dielectric layer on a substrate, forming a recording layer on said first dielectric layer, forming a second dielectric layer on said recording layer, forming a light reflection and heat dissipation layer on said second dielectric layer, and forming a crystallization accelerating layer in contact with at least a portion of said recording layer, said crystallization accelerating layer being made of a material comprising a substance selected fromi the group consisting of Bi, Bi-containing compounds, Al, Al-containing compounds, In, In-containing compounds, Tl and Tl-containing compounds, wherein the crystallization accelerating layer is a discontinuous layer.

14. A method as recited in claim 12, wherein the recording layer contains a crystallization accelerating element.

* * * * *